Patented Aug. 26, 1947

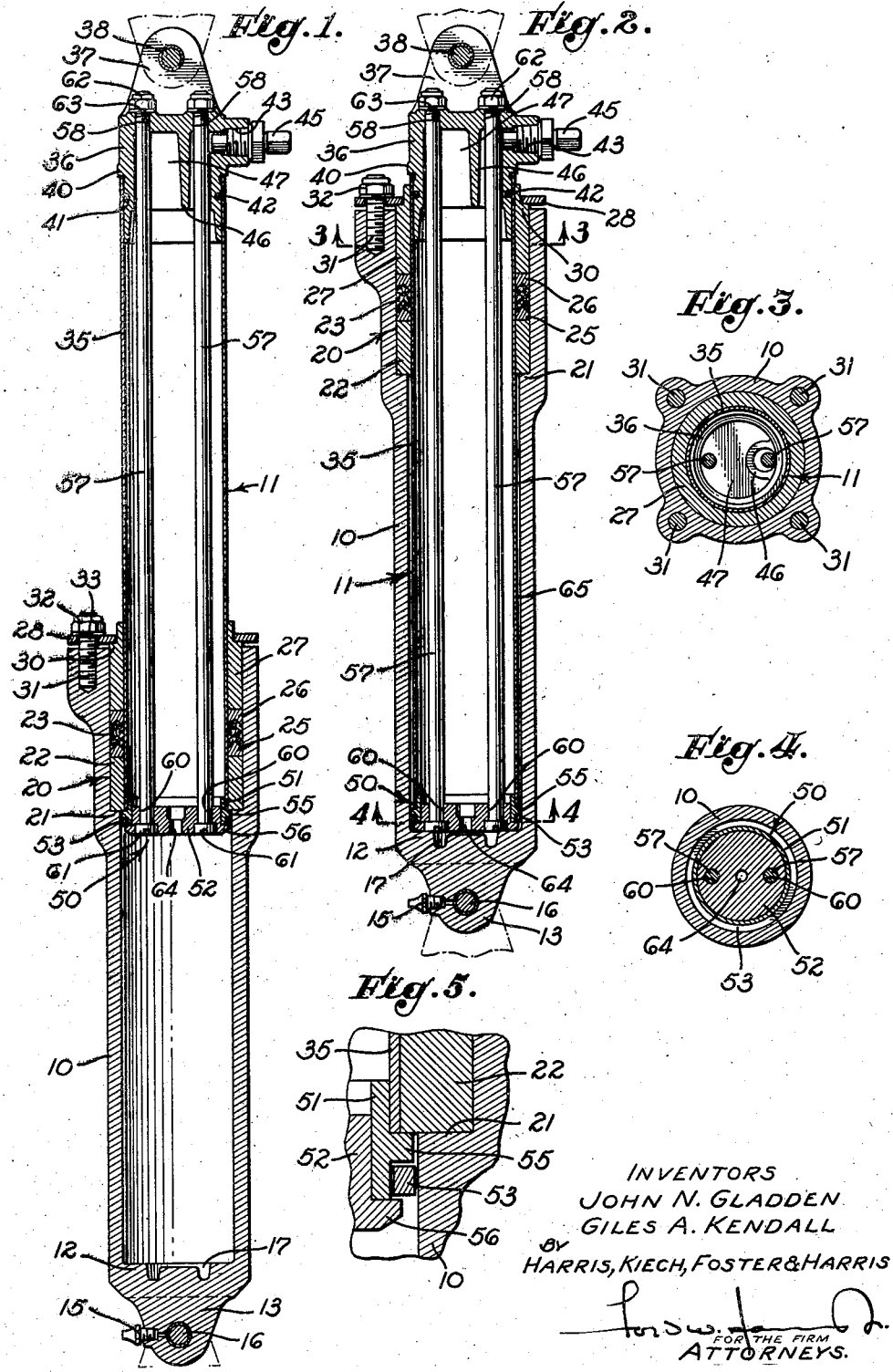

2,426,447

UNITED STATES PATENT OFFICE 2,426,447

SHOCK ABSORBER

John N. Gladden and Giles A. Kendall, Glendale, Calif.

Application August 11, 1942, Serial No. 454,472

4 Claims. (Cl. 267—64)

Our invention relates to shock absorbers, and is directed specifically to improvements in hydraulic shock absorbers of the general type that is employed for aircraft landing gear. It will be apparent, however, that the invention is not restricted to aviation.

A shock absorber of the general type under consideration here comprises an outer cylinder and an inner cylinder slidingly mounted therein for telescoping action, the two cylinders confining a body of fluid, preferably liquid. When a landing is made with the shock absorber extended, the shock of impact is cushioned largely by restricted fluid flow through a dash-pot aperture or passage between the two cylinders as the two cylinders telescope together. When the aircraft subsequently takes off, the weight of the landing gear tends to extend the shock absorber, but usually the tendency is reinforced by air under suitable pressure in the two cylinders. The termination of such extension of the shock absorber under the compulsion of highly compressed air must also be cushioned, and auxiliary dash-pot action for such purpose is provided by restricting flow with respect to an annular space between the cylinders.

The manufacture of the conventional shock absorber of this type is a time-consuming and expensive procedure. For satisfactory liquid-tight telescoping operation, the inner cylinder must have a polished peripheral surface of accurate cylindrical configuration. Usually the surface of the inner cylinder is plated with chromium and is then ground and polished to the required accuracy. Commonly, screw threads are employed for assembly, as many as five threads of the diameter of the inner cylinder being required for each shock absorber. The use of such threads slows up production, involves substantial labor cost, and requires thread-cutting machines costing several thousand dollars apiece. The dash-pot load imposed on the inner head is so severe and the dash-pot function is so important that screw threads alone cannot be trusted. Therefore, soldering or some equally effective expedient is employed at additional expense to keep the inner head from unscrewing. At least some screw threads may be eliminated by using welding, but welding necessitates replating and regrinding of the inner cylinder.

One object of our invention is to avoid the use of screw threads of the diameter of the inner cylinder and to avoid the necessity of welding, thereby to reduce the expense of manufacturing the shock absorber. In this regard a feature of our invention is the conception of providing two separate heads for the inner cylinder and of providing means apart from the cylinder interconnecting the two heads to hold the two heads in position. Another object is to employ such interconnecting means for multiple functions. Thus, in addition to holding the inner cylinder assembly together, the interconnecting means may carry a dash-pot load to avoid stressing the inner cylinder and may further serve as part of a combination for releasably retaining a dash-pot ring at the inner end of the inner cylinder.

Other objects of our invention, as will be explained more fully, are to provide a construction permitting the use of relatively light and relatively soft material in the outer cylinder, and to provide a simple construction with no tendency to bind by reason of warpage or minor misalignment.

The above and other objects and advantages of our invention will be apparent in our detailed description, taken with the accompanying drawing.

In the drawing, which is to be considered as illustrative only,

Fig. 1 is a longitudinal section of the shock absorber in extended position;

Fig. 2 is a similar view of the shock absorber in contracted position;

Fig. 3 is a transverse section taken as indicated by the line 3—3 of Fig. 2;

Fig. 4 is a transverse section taken as indicated by the line 4—4 of Fig. 2; and Fig. 5 is an enlarged detail of Fig. 1.

The drawing shows an outer cylinder 10 and an inner cylinder generally designated 11, the two cylinders being adapted to confine a fluid body, which fluid body may be a suitable light oil. The outer cylinder 10 is shown with an integral end wall 12 and an ear or bracket 13 for pivotal attachment to the aircraft. A suitable fitting 15 may be provided for supplying lubricant to the associated hinge pin 16. Preferably the end wall 12 is formed with a suitable inner recess 17 to avoid entrapping of liquid when the shock absorber is contracted to the position shown in Fig. 2. A feature of our invention is that the outer cylinder 10 may be made of aluminum or magnesium alloy, such material being quite light in weight, but not suited for frictional service.

The open end of the outer cylinder 10 is counter-bored to receive a cylindrical slide bearing generally designated 20 and to provide an annular shoulder 21 for abutment by the slide bearing. In our preferred construction the slide bearing 20 is an assembly comprising an inner guide sleeve 22, a plurality of chevron packing rings 23, a pair of packing followers 25 and 26, and an outer guide sleeve 27. Such a guide assembly may be retained in place in any suitable manner providing sufficient longitudinal pressure to cause the chevron packing to embrace the polished inner cylinder 11 in a substantially liquid-tight manner. In the present construction the outer guide sleeve 27 is reduced in diameter at its outer end to receive a retaining ring 28 and to provide a shoulder 30 for abutment by the retaining ring. The retaining ring 28 receives suitable studs 31 on the end of the outer cylinder 10 and is anchored by suitable nuts 32 and lock washers 33 on the studs.

The inner cylinder 11 comprises a simple cylindrical member 35 that is, by preference, chromium plated. An outer head 36 for the inner cylinder may be a casting of the configuration shown providing a bracket or ear 37 to receive a hinge pin 38 for mounting the shock absorber on the landing gear of the aircraft. The outer head 36 has a portion of reduced diameter to telescope into the cylindrical member 35 and to provide an annular shoulder 40 for abutment against the end of the cylindrical member. To make the joint liquid tight, the reduced portion of the head 36 may have a circumferential groove 41 to receive a suitable sealing ring 42.

The outer head 36 may be provided with a lateral port 43 into which is threaded an air valve 45 that serves as a plug, the air valve being removable to permit introduction of liquid into the shock absorber. Preferably, the head 36 is formed with an inner curved baffle 46, providing a downwardly extending passage from the lateral port 43 and providing an air trapping pocket 47 on one side thereof at the top of the shock absorber.

An inner head generally designated 50 for the inner cylinder may be of any suitable construction for abutting engagement with the inner end of the cylindrical member 35. In our preferred construction, the inner head 50 comprises two sections, namely, a ring member 51 and a wall member 52, the two sections being separable to releasably confine a dash-pot ring 53. The ring member 51 telescopes into the end of the cylindrical member 35 and is formed with a radial flange 55 that serves both to abut the end of the cylindrical member 35 and to limit movement of the dash-pot ring 53 in one longitudinal direction. The wall member 52 telescopes into the ring member 51 and has a radial flange 56 that serves both to abut the ring member 51 and to limit relative movement of the dash-pot ring 53 in the other longitudinal direction. Preferably, the dash-pot ring 53 is of relatively loose fit especially with respect to the surrounding outer cylinder 10, such looseness of fit being indicated in Fig. 5.

The cylindrical member 35, together with the outer head 36 and the inner head 50, comprises what may be termed an inner cylinder assembly, and in our preferred construction this assembly is held together by suitable means extending in tension between the two heads 36 and 50. Such tension means may comprise one or more tie rods 57 extending through apertures 58 in the outer head 36 and apertures 60 in the wall member 52 of the inner head 50. In the particular construction shown in the drawing, two tie rods 57 are employed, which tie rods have enlargements 61 at their lower ends and at their upper ends are threaded to receive suitable nuts 62 and lock washers 63. At least one dash-pot port or passage between the inner cylinder assembly and the outer cylinder may be provided, for example, by a suitable aperture 64 in the wall member 52. Such a dash-pot port is not always necessary.

It is apparent that the various structural elements of the shock absorber may be manufactured at low cost and may be assembled in a simple and rapid manner. No screw threads of the diameter of the inner cylinder are required. When the shock absorber is contracted to cushion the impact of a landing, liquid flows with a dash-pot action through the dash-pot aperture 64 from the outer cylinder 10 to the inner cylinder 11. In the course of such dash-pot action, the inner cylinder 11 is burdened with a considerable load in compression, but such loading tends to increase the pressure with which both the outer head 36 and the inner head 50 engage the cylindrical member 35.

When the aircraft takes off after a landing, highly compressed air in the air pocket 47 and inside the inner baffle 46 assisted by the weight of the landing gear extends the shock absorber with considerable force. The extension of the shock absorber is terminated by impact of the radial flange 55 at the inner end of the inner cyliner against the inner end of the slide bearing 20, and the force of such impact must be kept below a predetermined magnitude. When the shock absorber extends, liquid must flow out of the annular space 65 between the two cylinders past the dash-pot ring 53 into the outer cylinder 10 and the restriction of such flow by the dash-pot ring keeps the force of impact below the predetermined magnitude.

In the course of the extension of the dash-pot, considerable force is exerted in a direction tending to separate the inner head 50 from the cylindrical member 35, since considerable fluid pressure is built up both against the dash-pot ring 53 and the inner surface of the wall member 52. It is noteworthy that this force tending to separate the inner head 50 from the cylindrical member 35 does not create a strain at the juncture of the inner head and the cylindrical member and does not create tensile stress in the cylindrical member because the force is resisted solely by the two tie rods 57. In one practice of our invention the tie rods 57 are "preloaded" to a substantial extent by suitably tightening the nuts 62 at the time of assembly.

It is to be noted that the slide bearing 20 is of sufficient length to serve alone as an adequate guide for the inner cylinder 11. Such construction is to be distinguished from a common arrangement in which the inner end of the inner cylinder is formed as a piston for sliding engagement with the surrounding outer cylinder 10. In the present construction the adequacy of the slide bearing 20 makes it unnecessary to provide for any appreciable friction between the inner end of the inner cylinder and the surrounding outer cylinder. Since such friction is eliminated, we may employ aluminum for fabricating the outer cylinder.

It is to be further noted that the elimination of a piston at the inner end of the inner cylinder eliminates a common cause for the two cylinders binding. Thus, in the usual arrangement, a minor misalignment of the two cylinders relative to each other or any accident causing the outer cylinder to be forced out of round to a minor extent may cause the piston at the inner end of the inner cylinder to "freeze" in the outer cylinder. In the present arrangement, the looseness of fit of the dash-pot ring 53 with respect to the outer cylinder and/or with respect to the inner cylinder is a factor tending to preclude any such binding, and a further factor is the relatively small axial dimension of the dash-pot ring.

It will be apparent to those skilled in the art that the preferred form of our invention described herein as illustrating the principles involved may be widely varied without departing from our inventive concept, and we reserve the right to all such changes and modifications that properly come within the scope of our appended claims.

We claim as our invention:

1. A shock absorber of the character described, having: an outer cylinder closed at one end and open at the other end; a cylindrical slide bearing mounted in the open end of said outer cylinder, said bearing being of smaller inside diameter than said outer cylinder; an inner cylinder slidingly mounted in said bearing, said bearing being of sufficient length to guide said inner cylinder substantially coaxially of said outer cylinder, said two cylinders and bearing confining a body of fluid; an outer head in abutting engagement with the outer end of said inner cylinder; an inner head in two separable sections, one of said sections being in abutting engagement with the inner end of said inner cylinder; a ring confined between said two sections of the inner head for dash-pot action in cooperation with said outer cylinder, said ring loosely fitting in said outer cylinder to avoid wear and binding; and tie rods interconnecting said two heads in tension for the triple purpose of holding said two separable sections of the inner head together, of holding said outer and inner heads in place, and of transmitting dash-pot loads to said outer head when the shock absorber extends.

2. A shock absorber of the character described, having: an outer cylinder closed at one end and open at the other end; a cylindrical slide bearing mounted in the open end of said outer cylinder, said bearing being of smaller inside diameter than said outer cylinder; an inner cylinder slidingly mounted in said bearing, said bearing being of sufficient length to guide said inner cylinder substantially coaxially of said outer cylinder, said two cylinders and bearing confining a body of fluid; an outer head in abutting engagement with the outer end of said inner cylinder; a sleeve telescoped into the inner end of said inner cylinder and having a peripheral shoulder in abutting engagement with the inner cylinder; an inner head in abutting engagement with said sleeve; a ring confined between said shoulder and said inner head in loose fit with said outer cylinder for dash-pot action on fluid between the ring and the inner end of said bearing; and means interconnecting said two heads in tension for the dual purpose of holding said two heads in position and of transmitting dash-pot loads to said outer head during extension of the shock absorber.

3. A shock absorber as in claim 2 wherein said means interconnecting said two heads in tension are in the form of tie rods binding the heads upon the respective ends of said inner cylinder.

4. A shock absorber of the character described, having: an outer cylinder closed at one end and open at the other end; a cylindrical slide bearing mounted in the open end of said outer cylinder, said bearing being of smaller inside diameter than said outer cylinder; an inner cylinder slidingly mounted in said bearing, said bearing being of sufficient length to guide said inner cylinder substantially coaxially of said outer cylinder with said cylinders separated by an annular space, said two cylinders and bearing confining a body of fluid; an outer head in abutting engagement with the outer end of said inner cylinder; a sleeve telescoped into the inner end of said inner cylinder and having a peripheral shoulder in abutting engagement with the inner cylinder; an inner head in abutting engagement with said sleeve, said inner head having a dash-pot passage between said cylinders; a ring confined between said shoulder and said inner head in loose fit with said outer cylinder for dash-pot action on fluid between the ring and the inner end of said bearing; and means interconnecting said two heads in tension for the dual purpose of holding said two heads in clamped unthreaded position upon said inner cylinder and of transmitting dash-pot loads to said outer head during extension of the shock absorber.

JOHN N. GLADDEN.
GILES A. KENDALL.

REFERENCES CITED

The following references are of record in the file of this patent:

UNITED STATES PATENTS

| Number | Name | Date |
|---|---|---|
| 1,136,968 | McDade | Apr. 27, 1915 |
| 1,487,777 | Gruss | Mar. 25, 1924 |
| 1,767,105 | Wallace | June 24, 1930 |
| 1,780,659 | Wallace | Nov. 4, 1930 |
| 2,107,494 | Onions et al. | Feb. 8, 1938 |
| 1,856,660 | Schultz | May 3, 1932 |
| 1,621,261 | Lomar | Mar. 15, 1927 |
| 2,213,819 | Krueger et al. | Sept. 3, 1940 |
| 2,231,332 | Griepenstroh | Feb. 11, 1941 |
| 2,248,836 | Wallace | July 8, 1941 |
| 1,950,995 | Piccard | Mar. 13, 1934 |
| 65,135 | Strohe | May 28, 1867 |